April 19, 1955  L. S. WILLIAMS  2,706,598
COMPUTING WEIGHING SCALE
Original Filed May 14, 1948  7 Sheets-Sheet 1
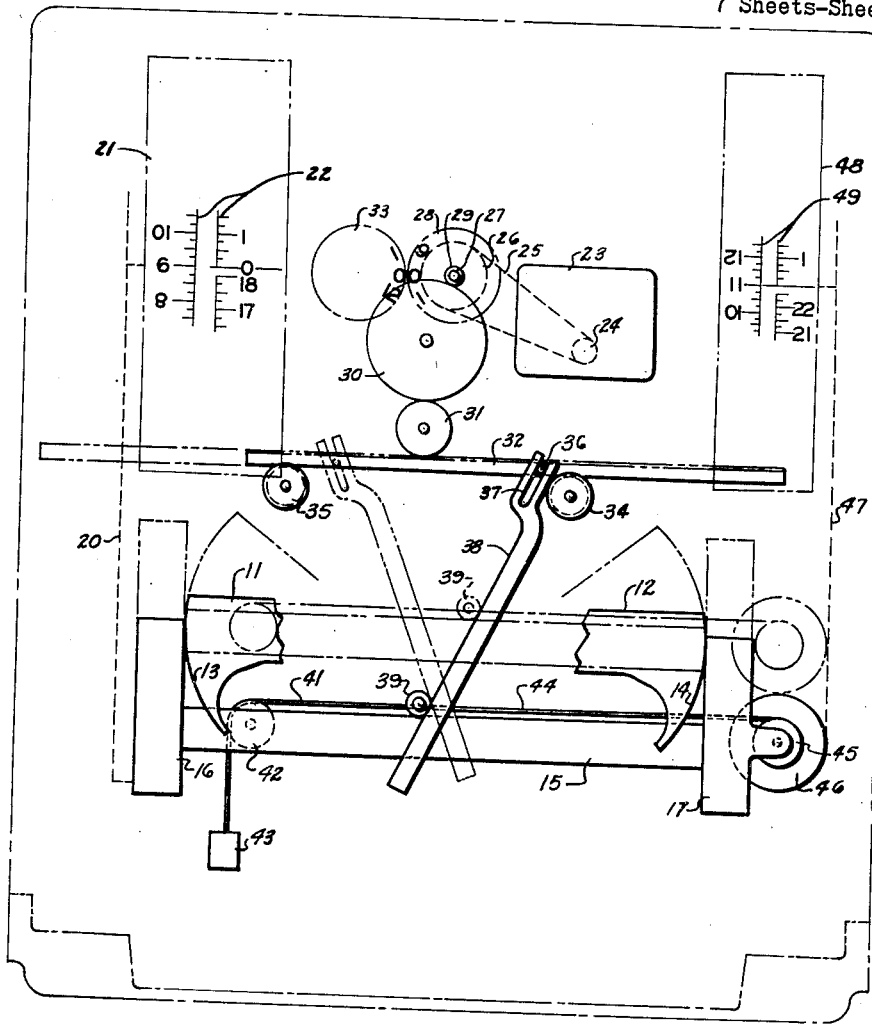
*Fig. II*
*Fig. I*
INVENTOR.
Lawrence S. Williams
BY
Marshall and Marshall
ATTORNEYS

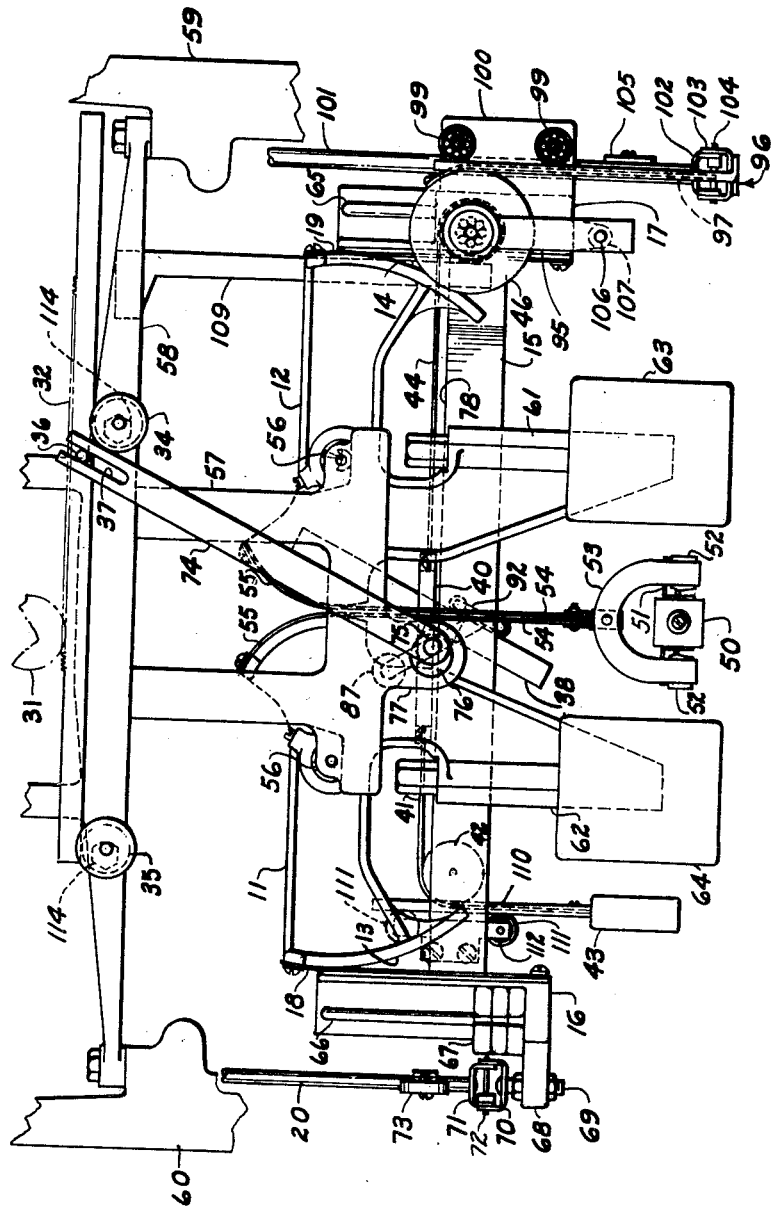

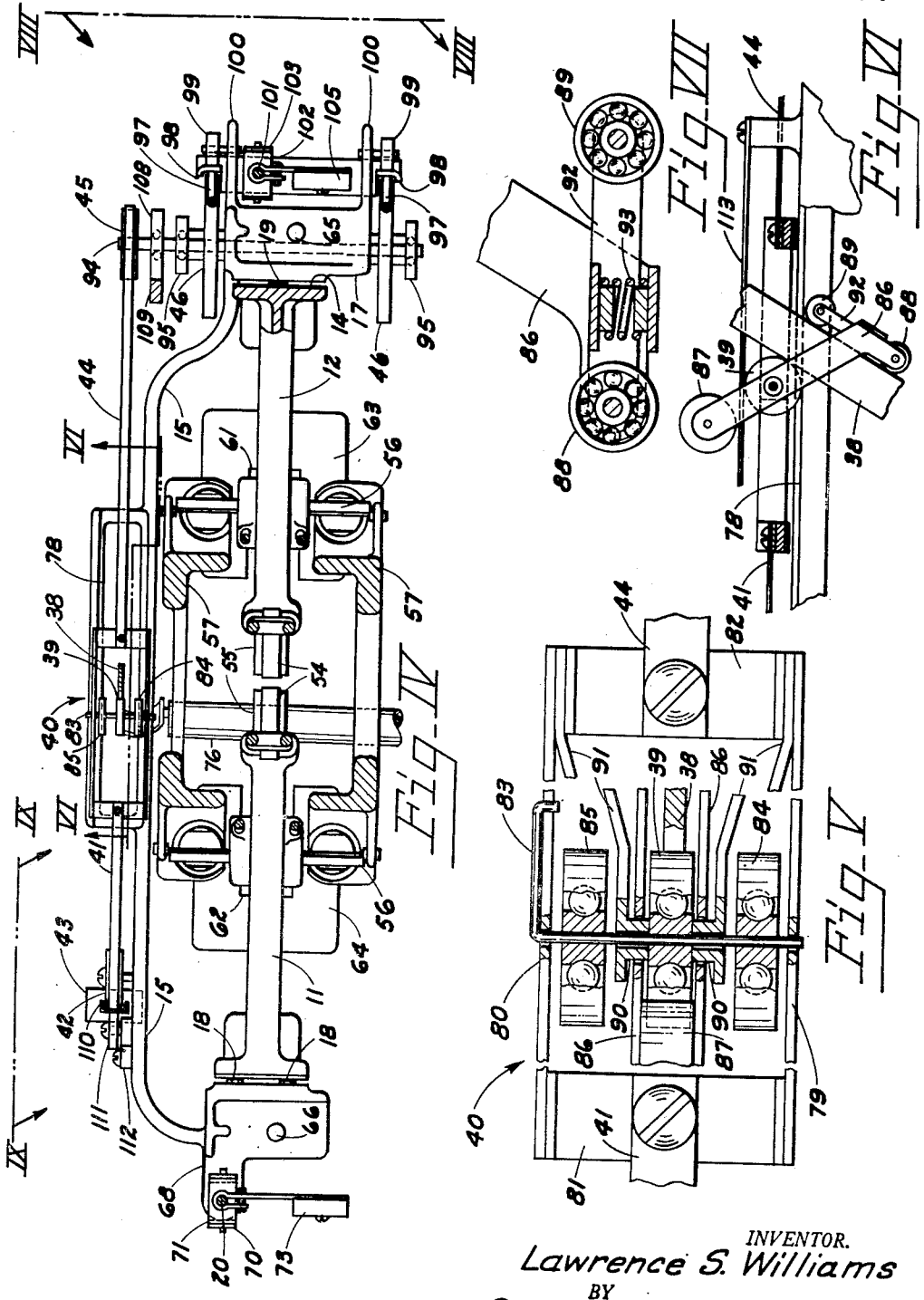

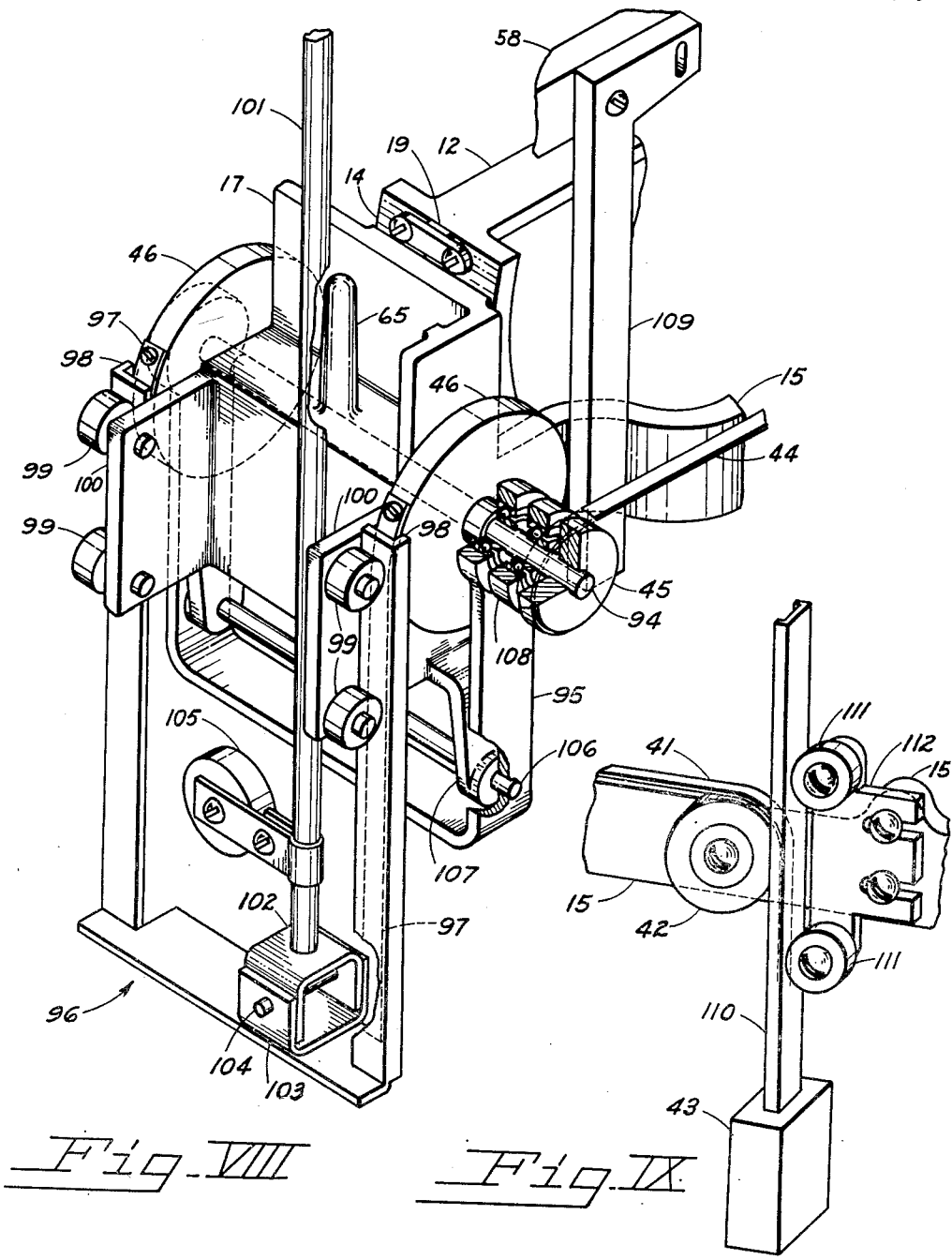

April 19, 1955 L. S. WILLIAMS 2,706,598
COMPUTING WEIGHING SCALE
Original Filed May 14, 1948 7 Sheets-Sheet 5
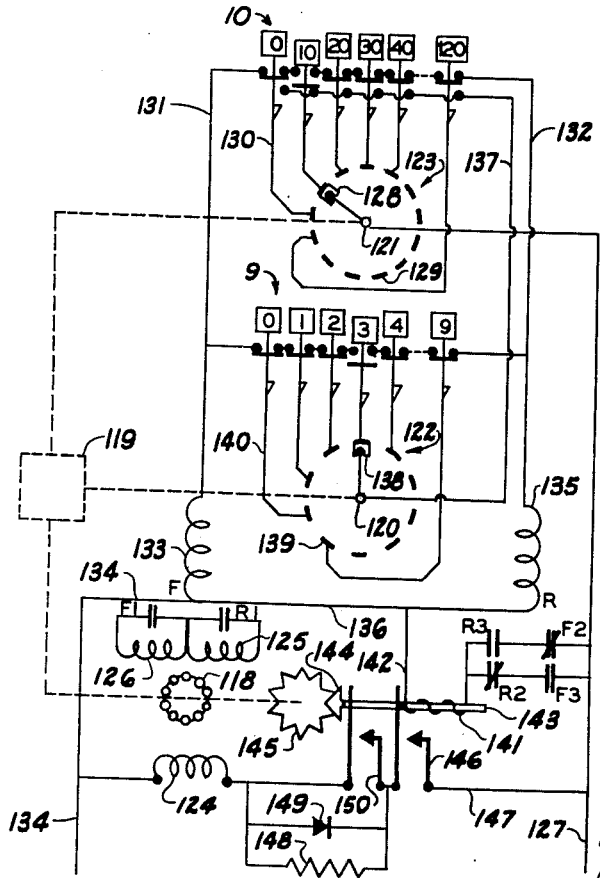
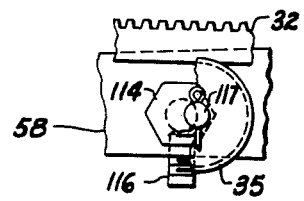
Fig. XI
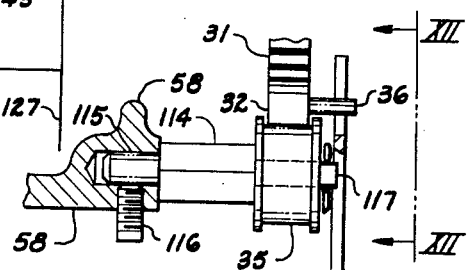
Fig. XII
Fig. XIII
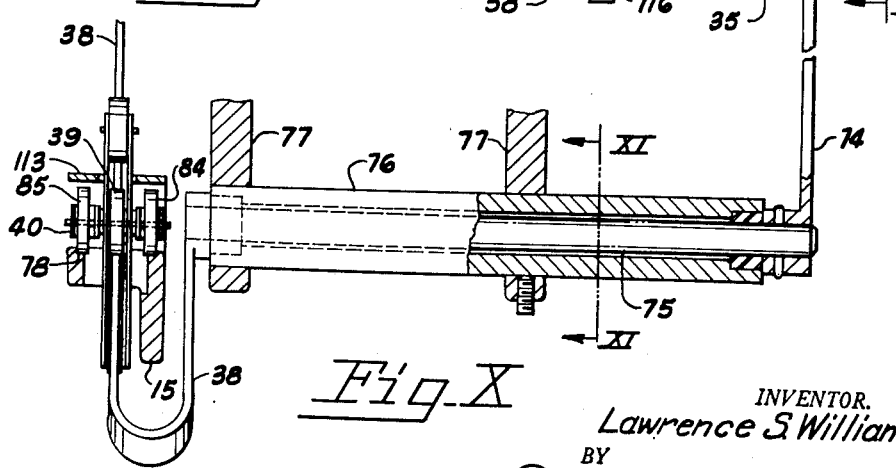
Fig. X
INVENTOR.
*Lawrence S. Williams*
BY
*Marshall and Marshall*
ATTORNEYS April 19, 1955
L. S. WILLIAMS
2,706,598
COMPUTING WEIGHING SCALE
Original Filed May 14, 1948
7 Sheets-Sheet 6
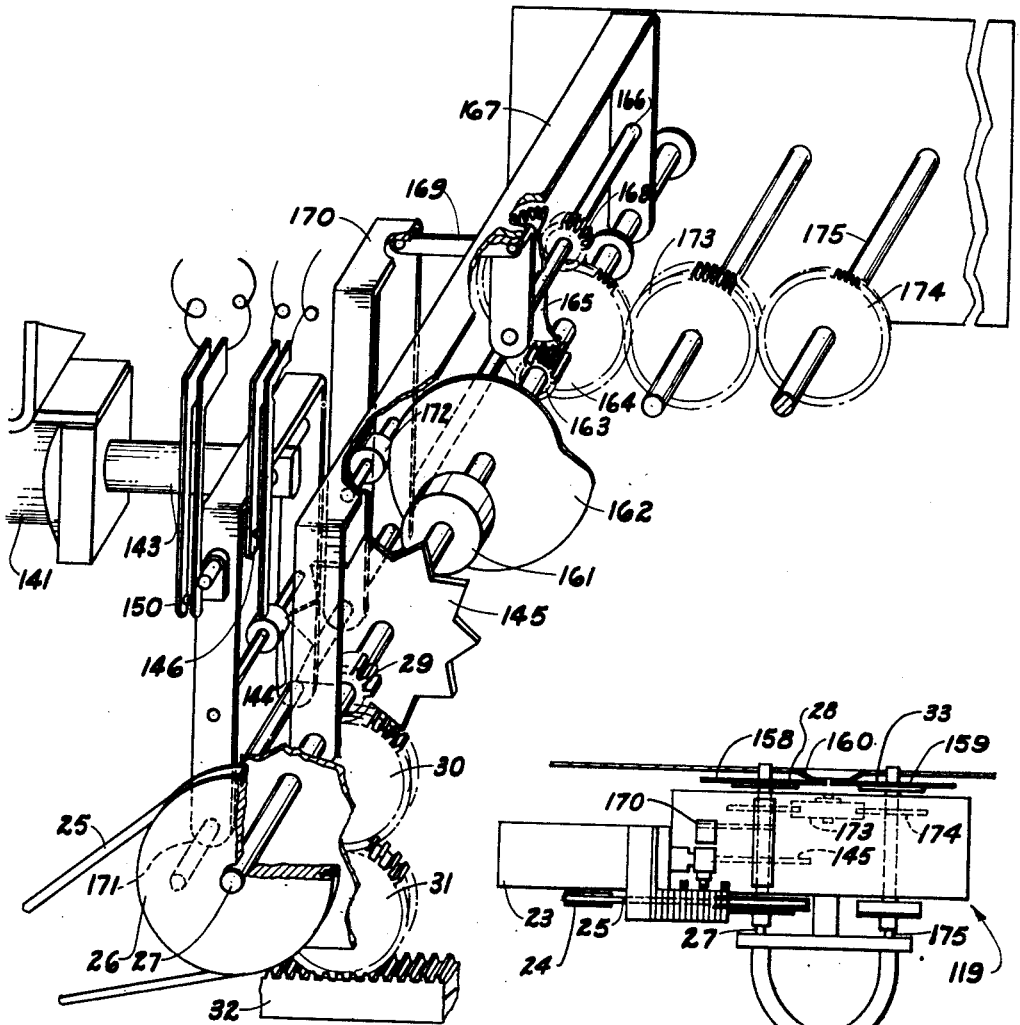
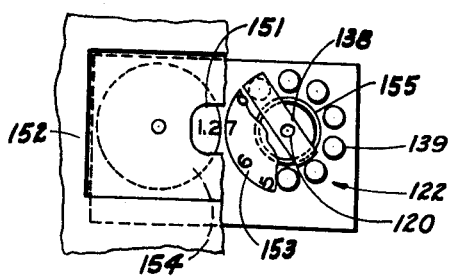
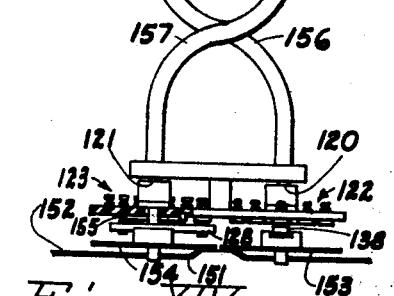
INVENTOR.
Lawrence S. Williams
BY
Marshall and Marshall
ATTORNEYS

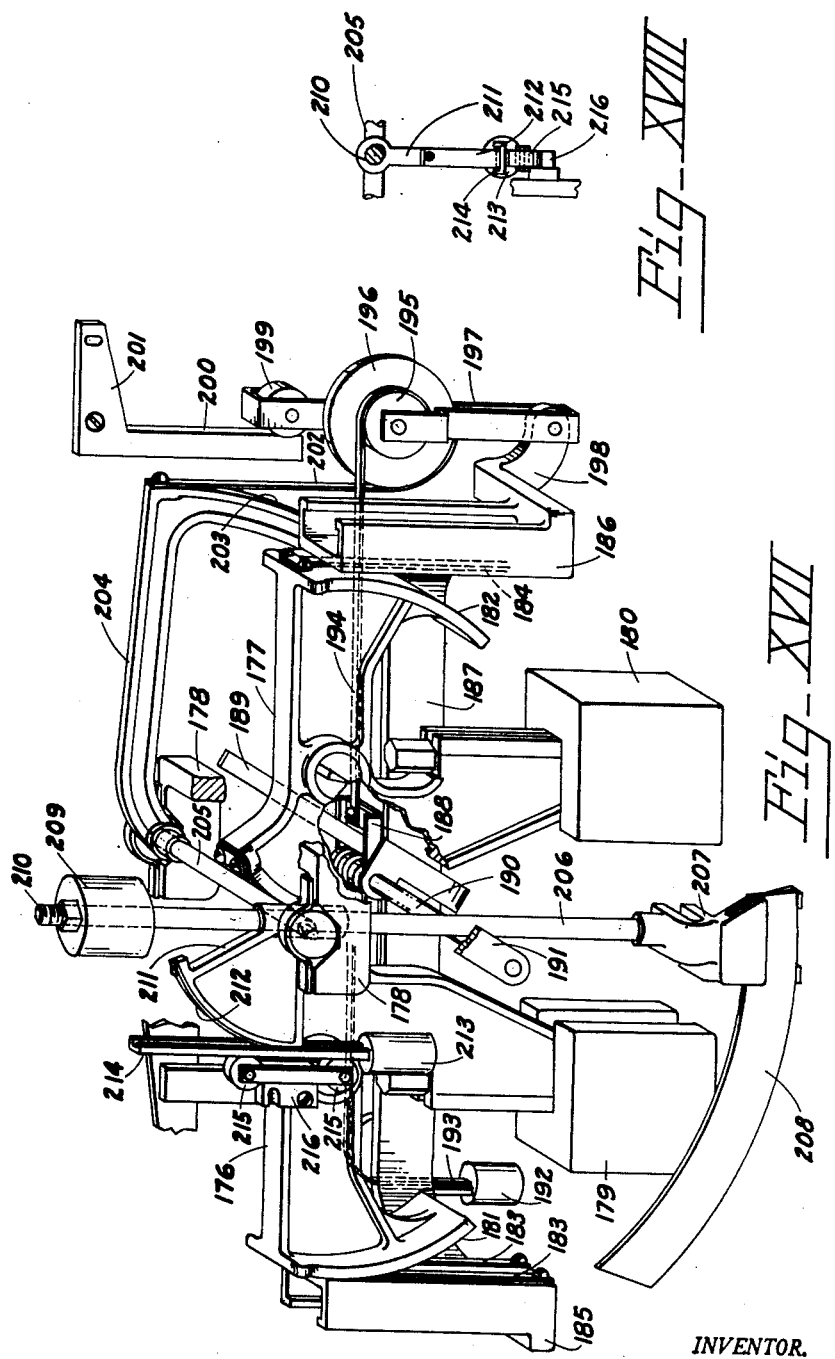

United States Patent Office 2,706,598
Patented Apr. 19, 1955

2,706,598

COMPUTING WEIGHING SCALE

Lawrence S. Williams, Toledo, Ohio, assignor to Toledo Scale Company, Toledo, Ohio, a corporation of New Jersey Continuation of application Serial No. 27,125, May 14, 1948. This application October 21, 1953, Serial No. 387,388

15 Claims. (Cl. 235—61)

This invention relates to weighing scales and in particular to a weighing scale that is equipped with auxiliary mechanism so that it may indicate not only the weight of the article placed on the load receiver but also the cost of such article as computed at a price that is set up by a keyboard mechanism and indicated by dials placed adjacent the weight and cost indications.

It is highly desirable that weighing scales intended for use in retail food stores be equipped so that not only will the weight of the load being weighed be displayed but also that the cost of the article shall also be displayed. In the past this has been accomplished by providing the scale with a rotatable chart and imprinting on the chart a large number of rows of cost indicia that are computed according to a series of arbitrarily selected prices. A person using such a scale, after placing the article on the load receiver, locates the price per pound on a price bar mounted adjacent the reading line of the chart and then reads the cost of money value of the load from the column or row of indicia corresponding to the particular price selected on the price bar. Such a weighing scale is subject to several disadvantages. In the first place, to secure an adequate selection of prices it is necessary to confine the cost indications to the merchant's side of the scale and the only indication afforded the customer is that of the weight of the purchased article. It is preferable to display cost indications to the customer as well so that the customer need not compute the cost of the article or depend upon the merchant to correctly read the cost from the indicia displayed on his side of the scale. Another disadvantage is the limited selection of prices that are available even through all of the computed values are shown on only one side of the scale.

The principal object of this invention is to provide a weighing scale suitable for use in retail food stores which scale displays to both the customer and the merchant indicia indicative of the load on the scale, the price of the commodity, and the cost of the commodity as computed from the weight and the price.

Another object of the invention is to provide a computing mechanism that correctly indicates the cost of the purchased article regardless of whether the load is applied before the price is selected or whether the price is selected before the load is placed on the scale or if the price selection is made during the movement of the scale mechanism toward its load counterbalancing position.

Another object of the invention is to provide mechanism that, except for the selection and setup of price, is operated entirely by force obtained from the weighing scale mechanism.

A still further object of the invention is to provide a multiplying mechanism in which the linear movement of a portion of the weighing scale mechanism combined with the angular position of a member that is rotated by the price selecting mechanism produces a movement of a third member which movement is proportional to the cost of the article and which third member serves to position a cost indicating chart.

A still further object of the invention is to provide adjustments in various portions of the multiplying mechanism so that the travel of the cost indicating chart may be adjusted to correspond exactly to the cost as determined by the product of the weight of the article multiplied by the price.

More specific objects and advantages are apparent from the following description of a preferred embodiment of the invention.

A weighing scale constructed according to the invention has a first member that is moved in a direction transversely to its length through a distance that is directly proportional to the load on the load receiver of the scale. A second member which may be called a tangent bar is mounted adjacent the first member and by means of price selecting mechanism is set at an angle with respect to the path of movement of the first member, the tangent of which angle is proportional to the price of the commodity. A small carriage arranged to run on a track on the first member is constantly held in contact with an edge of the tangent bar so that its movement along the track is proportional to the movement of the first member in response to weight multiplied by the tangent of the angle at which the tangent bar is positioned. Since the tangent of the angle at which the tangent bar is positioned is proportional to price it follows that the movement of the carriage along the first member is proportional to the product of weight times the price—the cost of the article. An indicating mechanism is driven according to the movement of the carriage and is calibrated according to the computed amounts as determined by the weight on the scale and the price corresponding to a given angle of the tangent bar.

For convenience in construction a portion of the amount or cost indicator driving mechanism is carried on the first member so that when the tangent bar is set parallel to the path of movement of the first member the cost is computed according to a price near the middle of the selectable range of prices. When the tangent bar is set for zero price the movement of the first member, as it affects the transmission of movement from the carriage to the amount indicating chart, exactly counteracts the movement of the carriage along the first member. When the tangent bar is set for maximum price the movement of the first member and the travel of the carriage along the first member add in effecting movement of the cost chart.

Two cost indicating methods are contemplated, a first of which employs a chart that may be directly viewed and which is rotated to a position corresponding to the amount. The second arrangement employs a transparent chart having a limited travel and an optical projection system to give enlarged indication.

A weighing scale constructed according to the invention is illustrated in the accompanying drawings.

In the drawings:

Figure I is a perspective view showing the exterior appearance of an improved scale constructed according to the invention.

Figure II is an elevation from the customer's side of the scale, in the nature of a schematic drawing, to illustrate the cooperation of the elements of the scale in effecting the multiplication of weight times price.

Figure III is an elevation, from the customer's side of the scale, of the load counterbalancing mechanism including the multiplying mechanism.

Figure IV is a horizontal section taken on a plane just above the top of the load counterbalancing mechanism shown in Figure III.

Figure V is a greatly enlarged plan view, partly in section, of the carriage that travels along the track formed in the first member.

Figure VI is an elevation, partly in section and with parts broken away, of the carriage as seen from the line VI—VI of Figure IV.

Figure VII is a greatly enlarged fragmentary detail of a portion of the mechanism that holds the carriage in contact with the tangent bar.

Figure VIII is a perspective view of one end of the load counterbalancing mechanism as seen from the line VIII—VIII of Figure IV.

Figure IX is a perspective view of a portion of the load counterbalancing mechanism as seen from the line IX—IX of Figure IV.

Figure X is a fragmentary vertical section taken through the mounting of the tangent bar.

Figure XI is a vertical section taken along the line XI—XI of Figure X.

Figure XII is a fragmentary elevation, with parts broken away, as seen from the line XII—XII of Figure X.

Figure XIII is a schematic wiring diagram showing the circuits employed in setting up the price indication.

Figure XIV is a fragmentary plan view showing the general arrangement of the price setting and indication mechanism.

Figure XV is a fragmentary elevation, with parts broken away, showing one of the price indicating structures.

Figure XVI is an expanded view of a portion of the drive of the price setting mechanism.

Figure XVII is a perspective view of the load counterbalancing mechanism of the scale arranged to drive a projection chart for indicating the cost of the article on the load receiver of the scale.

Figure XVIII is a fragmentary plan view showing a portion of the counterbalancing member and its cooperation with a sector of the cost indicating mechanism.

These specific figures and the accompanying description are intended merely to illustrate the invention but not to impose limitations on the claims.

Referring now to Figure I, the improved weighing scale includes a platter or load receiver 1 that overlies a portion of a base 2. An upright housing 3 erected from the rear portion of the base 2 is surmounted by a cylindrical housing 4 in which are located indicating means for displaying indicia indicative of the weight, the price per unit of weight, and the cost of the article as determined by the weight and price. The indicia indicative of weight appear within a window 5 while the price indication appears in a window 6 and the total cost of the article is shown in a window 7. The windows 5, 6 and 7 are located on the merchant's side of the cylindrical housing 4 and, if desired, a similar set of windows may be arranged on the customer's side of the scale so that both the merchant and the customer may simultaneously observe the weight, the price, and the cost of the article. A keyboard mechanism 8 is attached to the front of the base 2 and contains banks of keys 9 and 10 that correspond respectively to the units and tens of the price to be selected. There are ten of the units keys 9 corresponding to the digits from zero through 9 and there are 13 of the tens keys 10 corresponding to dimes values from zero through 12. The complete range of prices that may be selected thus extends from zero to $1.29.

Referring now to Figure II, forces from loads applied to the platter 1 are transmitted through a lever system and are applied to pendulum bodies 11 and 12 (of which only portions are shown in Figure II). The forces from the load cause the pendulum bodies to rotate through angles that are directly proportional to the magnitude of the load. The pendulum bodies 11 and 12 include arcuate surfaces 13 and 14 that are concentric with respect to the turning centers of the pendulums and support a rack drive frame 15 having loading boxes 16 and 17 at its ends. The rack drive frame 15 is suspended from the pendulum bodies 11 and 12 by steel ribbons 18 and 19 (Figure III) that are attached to the upper ends of the arcuate surfaces 13 and 14 and to the lower ends of the juxtaposed surfaces of the loading boxes 16 and 17. Since the pendulum bodies 11 and 12 are rotated through equal angles for equal increments of load, the rack drive frame 15 constitutes a first member that is moved transversely to its length through a distance that is directly proportional to the load on the weighing scale load receiver.

The vertical motion of the rack drive frame 15 is transmitted through a rack rod 20 (Figure III) which is indicated by a dotted line in Figure II. The rack of the rack rod 20 acts through a pinion to rotate a drum chart 21 upon which is printed or otherwise inscribed a series of weight indicia 22. There are two such rows of indicia 22, one of which is visible through the window 5 and the other of which is visible through a corresponding window on the customer's side of the scale.

A motor 23 having a pulley 24 on its armature shaft is connected through a belt 25 to a pulley 26 carried on a units shaft 27. The units shaft 27 carries a units dial 28 and a pinion 29 which through idler gears 30 and 31 drives a rack 32. The units shaft 27 also drives through a gear mechanism (not shown in Figure II) a tens dial 33 that is arranged to advance one-thirteenth of a revolution at the end of each revolution of the units shaft 27. The motor 23 is energized through an electrical circuit shown in Figure XIII, which circuit is controlled by the banks of keys 9 and 10 so that it sets up an indication on the dials 28 and 33 that corresponds to the actuated ones of the keys 9 and 10 and, in setting up such indication, translates rack 32 to a position that corresponds to the selected price.

The rack 32 is carried on rollers 34 and 35 that are journaled in the frame of the scale and is, furthermore, provided with a pin 36 that engages a slot 37 cut in the upper end of a tangent bar 38. The tangent bar 38 is mounted to rotate about an axis that is coaxial with the axis of a roller 39 when such roller is in its zero position as indicated by the solid lines in Figure II. The straight side of the tangent bar 38 that contacts the roller 39 is parallel to and displaced from the axis of the slot 37 so that the center line of the slot when produced parallel to the edge of the bar 38 passes through the axis of the roller 39. Since the tangent bar 38 is mounted to rotate about a point (the apex of a right triangle) located at a distance (the altitude of the triangle) from the rack 32, and since the rack 32 is translated along its length a distance that is proportional to price (the base of the triangle) it follows that the tangent of the angle to which the tangent bar is moved varies directly as the price.

The roller 39 is part of a carriage or traveler 40, shown in Figures IV and V, that is adapted to travel in a track formed on the upper surface of the rack drive frame 15. As is schematically illustrated in Figure II the roller 39 (which forms part of the carriage 40) is connected through a ribbon 41, which is trained over a pulley 42 journaled on the rack drive frame 15, to a weight 43 that tends to pull the roller 39 away from the edge of the tangent bar 38. The roller 39 is also connected through another ribbon 44 that is wound on a small drum 45 that is journaled in the loading box 17 at the end of the rack drive frame 15. A larger drum 46 is carried on the same shaft and constrained to rotate with the smaller drum 45. The larger drum 46 is connected to a drive mechanism 47 arranged to rotate a drum chart 48 on which cost indicia 49 are printed.

There are two sets of indicia 49 placed on the chart 48, one set of which is visible through the window 7 while the other set may be seen from the customer's side of the scale through a window located on the opposite side of the housing 4 from the window 7.

The driving mechanism for the chart 48 thus includes the smaller drum 45 and the larger drum 46 that are carried on the rack drive frame 15 and thereby are translated upwardly a distance that is proportional to the weight of the article being weighed. When the tangent bar 38 is in its zero price position, as is indicated by the solid line in Figure II, the upward movement of the rack drive frame 15 causes the roller 39 to move toward the right in the figure thus causing the drums 45 and 46 to rotate clockwise. The zero position of the tangent bar 38 and the relative diameters of the drums 45 and 46 are selected so that in the zero price position the clockwise rotation of the drum 46 counteracts its upward translation so that the rack drive 47 remains stationary in space.

At the middle of the price range when the tangent bar 38 is vertical the roller 39 is not translated horizontally as the rack drive frame 15 is moved by the change of load on the scale. In this condition the drums 45 and 46 are not rotated and the upward translation of the frame 15 is transmitted through the rack drive 47 to rotate the chart 48.

When the scale is set for maximum price the tangent bar 38 occupies the position shown in the dot-dash lines so that the roller 39 is translated toward the left as the rack drive frame 15 moves upwardly. This movement to the left rotates the drums 45 and 46 counterclockwise so that the resulting movement imparted to the rack drive 47 and the cost chart 48 corresponds to the sum of the translation and rotation of the drum 46.

Referring now to Figure III, which shows the construction of the load counterbalancing mechanism, the load forces from the load receiver 1 are transmitted through a lever having a nose 50 in which is mounted a knife edge pivot 51. The pivot 51 rests in V-bearings 52 of a stirrup 53 that is suspended by power ribbons 54 from power sectors 55 of the pendulum bodies 11 and 12. The pendulum bodies 11 and 12 are supported on knife edge pivots 56 that rest in V-bearings mounted in a frame 57 that depends from a cross member 58 spanning the space between uprights 59 and 60 erected from the base 2 of the scale.

The pendulum bodies 11 and 12 have downwardly-directed portions that include tracks 61 and 62 on which are mounted pendulum weights 63 and 64 for determining the load counterbalancing capacity of the pendulums. The geometry of the pendulum bodies 11 and 12 is such that the pendulums rotate through equal angles for equal increments of load. To secure this exact correspondence between angle of rotation and load it is necessary that the rack drive frame 15 including the loading boxes 16 and 17 have a certain weight. To permit adjustment of this weight the loading boxes 16 and 17 are provided with pins 65 and 66 on which lead slugs 67 may be stacked until the correct weight is attained.

The loading box 16 is provided with a laterally extending lug 68 having a vertical hole drilled therethrough in which is adjustably mounted a screw 69 the upper end of which carries a yoke 70 adapted to receive a similar yoke 71 attached to the bottom end of the rack drive rod 20. The yokes 70 and 71 are connected together by a pin 72 that guides the rack rod 20 while permitting the rack to move into or out of tight engagement with a co-operating pinion on the axle of the chart 21. A counterweight 73 attached to the rack rod 20 urges the rack into mesh with the pinion.

In Figure II the tangent bar 38 was indicated as being one piece. This is not strictly true as one part of the tangent bar 38 is located forward of the counterbalancing mechanism while the other part of it is located at the back side of the mechanism. Thus in Figure III the portion of the tangent bar 38 along which the roller 39 travels appears behind the load counterbalancing mechanism while another arm 74 which is connected to the tangent bar 38 by means of a shaft 75 appears on the forward side of the counterbalancing mechanism. The shaft 75 is journaled in an eccentric sleeve 76 which in turn is mounted in depending ears 77 of the frame 57.

Referring now to Figure IV, which is a horizontal section taken just above the pendulum bodies 11 and 12, the rack drive frame 15 for a portion of its length adjacent the frame 57 is widened out and slotted to provide a track 78 along which the carriage 40 including the roller 39 may travel. The carriage 40 serves to connect the roller 39 to the ribbons 41 and 44. The carriage itself, shown at enlarged scale in Figure V, includes side members 79 and 80 which at their ends are connected by cross-pieces 81 and 82 to which the ribbons 41 and 44 are connected. An axle 83 spanning the space between the side members 79 and 80 carries the roller 39 as well as a pair of rollers 84 and 85 which are adapted to run in the track 78. The rollers 39, 84 and 85 preferably are small ball bearings to minimize the friction opposing the motion of the carriage 40 along the track 78.

Since the horizontal motion of the carriage 40 is employed to drive the cost indicating chart 48 and since any force opposing the motion of the carriage 40 would, when acting against the inclined tangent bar 38, produce a vertical component of force acting against the rack drive frame 15 it is apparent that the frictional forces opposing the motion of the carriage 40 must be reduced to a minimum if the scale is to give accurate weight indications. It will be recalled that the rack drive frame 15 is carried from concentric sectors 13 and 14 of the pendulum bodies so that any change in vertical force applied to the rack drive frame 15 causes a change in load indication.

Because of this effect the entire drive mechanism of the cost chart 48 including the carriage 40 and the ribbons 41 and 44 is balanced and placed in neutral equilibrium so that it is easily driven to any position and displays no tendency to return to a given position. This condition of neutral equilibrium requires additional structure to maintain contact between the roller 39 and the tangent bar 38. This structure is most clearly shown in Figures VI and VII. This structure includes a light metal frame 86 having a counterweight 87 at one end and a pair of rollers 88 and 89 at the other end. The frame 86 is journaled on trunnions 90 formed in the ends of arms 91 forming part of the carriage 40. The trunnions 90 are concentric with the axle 83 so that the frame 86 pivots about the axis of the rollers 39, 84 and 85 that contact the track 78 and tangent bar 38. The rollers 88 and 89 carried in the foot end of the frame 86 bear on the tangent bar 38 on the side opposite the roller 39. The purpose of the rollers 88 and 89 is to lightly engage the tangent bar 38 so as to hold the roller 39 in contact with the tangent bar as it rides up and down with the rack drive frame 15.

In order that there be no backlash or lost motion between the rollers 39 and the tangent bar 38 the roller 88 has its axle rigidly mounted in the toe of the frame 86 while the roller 89 is carried on a light-weight metal yoke 92 that is pivoted about the axle of the roller 88 and that is urged toward the tangent bar 38 by means of a helical compression spring 93 interposed between a crosspiece at the bottom end of the frame 86 and a portion of the yoke 92. The compression spring 93 urges the roller 89 against the tangent bar 38 and tends to rotate the frame 86 in a direction to maintain the roller 39 and the fixedly mounted guide roller 88 in contact with the tangent bar 38.

Since it is necessary, in order to achieve the desired accuracy, to eliminate all lost motion between the roller 39 and the carriage 40 and since there may be some lost motion between the side members 79 and 80 and the axle 83 as well as a possibility of lost motion between the axle 83 and the roller 39, the frame 86 is journaled on the trunnions 90 instead of on the axle 83. Being journaled in this manner the force transmission path from one edge of a tangent bar 38 to the other edge includes the rollers 88 and 89, a portion of the frame 86, the trunnions 90, the arms 91, the carriage side members 79 and 80, the axle 83, and the roller 39. Since all of these members are urged in one direction by the force supplied by the helical compression spring 93 and transmitted through this path it follows that there are no joints or connections that are subject to lost motion. The elimination of the lost motion between the carriage 40 and the tangent bar 38 permits very accurate indication of the travel of the roller 39 which travel is proportional to the computed cost of the load on the weighing scale.

Referring now to Figures IV and VIII, the ribbon 44 that is connected to the carriage 40 is wound around the small drum 45 that is mounted on a shaft 94 journaled on ball bearings mounted in the upper ends of upwardly directed arms of a frame 95 pivotally mounted from the loading box 17. The shaft 94 also carries the drums 46 so that these drums rotate through the same angle that the smaller drum 45 rotates. A U-shaped drive yoke 96 has steel ribbons 97 connected near the base of the legs of the yoke 96 and overlying and attached to the periphery of the drums 46 so that the U-shaped drive yoke 96 is raised or lowered through a distance that is proportional to the rotation of the drums 46 and, therefore, proportional to the horizontal travel of the carriage 40. The sides of the U-shaped yoke 96 are turned down to provide flanges 98 that cooperate with the edges of the drums 46 to guide the drive yoke 96 during its vertical motion. Ball bearing rollers 99 are mounted on extended sides 100 of the loading box 17 in position so that the ball bearing rollers 99 hold the legs of the U-shaped yoke almost in contact with the peripheries of the drums 46.

A rack rod 101 constituting part of the drive mechanism 47 has at its foot a small yoke 102 the legs of which fit between the legs of a similar yoke 103 mounted on the base of the U-shaped drive yoke 96. A pin 104 pivotally connects these yokes so that the rack rod 101 may lightly engage a pinion mounted on the shaft of the cost or computed amount chart 48. A counterweight 105 mounted on the rack rod 101 serves to hold the rack of the rack rod 101 in mesh with the pinion.

The weight of the rack rod 101 and the drive yoke 96 and the parts attached thereto produces tension in the steel ribbon 44 connected to the carriage and tends to pull the carriage toward the right as seen in Figures III and IV. The weight 43 that is connected to the carriage 40 by means of the ribbon 41 supplies force acting in the opposite direction to exactly balance the pull in the ribbon 44.

In the construction of the load counterbalancing mechanism, it is impossible to eliminate all end play between the concentric surfaces 13 and 14 of the pendulums 11 and 12 and the adjacent surfaces of the loading boxes 16 and 17. Therefore, there is some clearance between these juxtaposed surfaces and a corresponding uncertainty in the horizontal position of the rack drive frame 15. The drive from the carriage 40 to the cost indicating chart 48 includes the shaft 94 (carrying the drums 45 and 46) which must therefore be mounted so that its horizontal position is determined independently of the rack drive frame 15. In this example this is accomplished by supporting the frame 95 on pintles 106 projecting laterally from depending ears 107 of the loading box 17 and located directly beneath the normal position of the shaft 94.

The horizontal position of the shaft 94 is controlled by the cooperation of a roller 108 mounted on the shaft 94 and a strraight substantially vertical track 109 depending from the cross member 58 of the frame of the scale. Since both the vertical track 109 and the tangent bar 38 are mounted in the frame of the scale, and since the tension in the ribbon 44 continuously holds the frame 95 into position with the roller 108 resting against the track 109 it follows that the rotation of the shaft 94 is a function only of the distance from the track 109 to the tangent bar 38 and is independent of the horizontal position of the rack drive frame 15.

The vertical track 109 is made adjustable with respect to the frame member 58. This adjustment, which may be either translation or change of slope, may, by translation, be used to adjust the zero of the computed amount indication and by a change in slope produce a result equivalent to adding or subtracting a constant to or from the price because when the track 109 is angularly positioned it adds a component of indicator movement to that produced by the ribbon 44 and carriage 40. The angular adjustment or change in slope is equivalent to a similar change in slope of the tangent bar 38 insofar as the computed amount indication is concerned.

The ribbon 41 that holds the carriage 40 against the tension of the ribbon 44 is carried over the pulley 42 mounted on the rack drive frame 15 and at its end carries the weight 43. To prevent the weight 43 from swinging it is provided with an upwardly-directed channel-shaped guide 110 (Figures IV and IX) that partially overlies the rim of the pulley 42 and that is loosely held against the pulley 42 by a pair of backing rollers 111 mounted on a bracket 112 adjustably attached to the rack drive frame 15.

As mentioned previously, the tangent bar 38 is mounted on one end of the shaft 75, the other end of which carries the slotted arm 74, the slot of which engages the pin 36 of the rack 32. These parts are clearly shown in Figure X. The tangent bar 38, as seen from the end of the load counterbalancing mechanism is J-shaped with the short leg of the J attached to the end of the shaft 75 and with the long side of the J extending up through the slot in the track 78 cut in the rack drive frame 15. This shape of bar is necessary in order that the straight part of the bar forming the surfaces along which the roller 39 and the backing rollers 88 and 89 run may be, in effect, rotated about the axis of the shaft 75 and yet avoid interference between the shaft 75 and the rack drive frame 15. This figure also clearly shows a slotted guard member 113 that is mounted from the rack drive frame 15 above the track 78 to prevent the rollers 84 and 85 of the carriage 40 from leaving the track.

The eccentric location of the shaft 75 within the sleeve 76 is clearly shown in Figure XI.

Figures X and XII also show in detail the mounting of the grooved rollers 34 and 35 that are mounted on studs 114 projecting laterally from the cross member 58 and adapted to carry the rack 32. Each of the studs 114 is shown as being made from hexagonal stock one end of which is turned down to provide a tenon 115 that is concentric with the axis of the stud and is secured in a hole in the cross member 58 by means of a set screw 116. The other end of each stud 114 is turned down to provide an offset tenon 117. The studs 114 are constructed in this manner so that by slight rotation of the studs the elevation of the grooved rollers 34 and 35 may be varied and thus provide adjustment of the path of travel of the rack 32.

The principal of operation of the tangent bar computing system was discussed in connection with Figure II. In actual construction it is necessary to provide adjustments so that errors in manufacture and misalignment in assembly may be compensated and correct indications obtained. The pendulum bodies 11 and 12 are designed to rotate through equal angles for equal increments of load and the position of the pendulum weights 63 and 64 along the tracks 61 and 62 plus the adjustment of the weight of the rack drive frame by means of the slugs 67 permits adjustment to secure the exact relationship between the pendulum rotation and the magnitude of the load. The track 78 is machined in the rack drive frame 15 and care is taken to insure that the track is straight and reasonably parallel to the length of the rack drive frame 15. The line of travel of the pin 36 on the rack 32 is adjusted by means of the rotatable eccentric studs 114 until it is precisely parallel to the track 78 of the rack drive frame 15. As long as this parallelism between the path of the pin 36 and the track 78 is maintained the travel of the carriage 40 will be exactly proportional to the vertical movement of the rack drive frame 15 with the proportionality constant determined by the angle of the tangent bar 38.

It is necessary in order to obtain correct multiplication that, when the load on the scale is zero, the price may be changed without moving the cost or computed amount chart 48. The zero position of the rack drive frame 15 is fixed as soon as the load counterbalancing mechanism is adjusted to weight correctly. To multiply correctly at zero weight (when a computed value is zero regardless of price) it is necessary that the axis of the roller 39 be in exact alignment with the axis of the shaft 75 carrying the tangent bar. This alignment is obtained by rotating the eccentric sleeve 76 until the price may be changed without moving the cost chart. The travel of the cost chart for a given change in price at a given weight is adjusted by raising or lowering the rack 32 while maintaining it parallel to the track 78 of the loading frame 15. The order of making these adjustments is first to set the axis of the shaft 75 in alignment with the axis of the roller 39 when there is no load on the scale; second, to locate the zero position of the pin 36 and the rack 32 so that weight may be added to or taken from the scale without moving the cost chart 48; third, adjusting the distance between the track 78 and the rack 32 to secure the desired travel of the cost chart at a given weight for a given change in price; fourth, adjusting the parallelism between the track 78 and the rack 32. These adjustments are interdependent and the correct combination of adjustments is obtained by successive adjustments first of one element and then another until finally the combination of adjustments satisfies the requirements.

The rack 32 is moved along its length by means of the motor 23 which motor 23 is controlled by circuits selected by the banks of price setting keys 9 and 10. The control circuit is shown schematically in Figure XIII and the gear drive and price indicating mechanism is shown in Figures XIV, XV and XVI. The control circuit includes a plurality of contacts selected by the keys, a pair of selector switches or commutators the movable elements of which are driven by the motor 23, and an electrical circuit that causes the motor to drive the selector switches or commutators to the position selected by the actuated keys. As illustrated in Figure XIII, the motor 23 has an armature 118 that is connected through gearing 119 to rotary shafts 120 and 121 of a pair of selector switches or commutators 122 and 123. The motor 23 is of the reversible shaded pole variety having a field coil 124 and shading coils 125 and 126.

The bank of keys 10, by which the tens value of the price is selected, control a plurality of contacts which, when no key is depressed, form a continuous circuit from one end of the bank of keys to the other end. When a key is depressed the continuous circuit is broken at two points, one on each side of the key, and the intermediate isolated portion of the circuit is connected to a third circuit. The units bank of keys 9 has a similar series of contacts but in this case there is no third circuit involved. Each of the key operated contacts is connected to one point of one of the selector switches 122 or 123. Electrical current supplied from a power source through a lead 127 flows to a slider 128 of the selector switch 123 which cooperates with contacts 129 of the selector switch 123. The contacts 129 are connected one to each of the contact portions of the keys 10 by means of leads 130. If the slider 128 engages a contact 129 that is connected to an undepressed key, current flows through the series of contacts to one or the other of leads 131 or 132 depending upon whether the electrically energized key is below or above the depressed key. If below, current flows through the lead 131 and through a coil 133 of a forward relay and through a lead 134 that is connected to the other side of the source of electrical power. If the slider 128 is connected to a key that is above the depressed key, current flows through the lead 132 and a coil 135 of a reverse relay and than through a lead 136 that is connected to the lead 134.

The forward and reverse relays are so designated because the forward relay through its contacts F1 shorts the shading coil 126 to cause the motor to drive the price setting mechanism including the selector switches toward a higher price while the reverse relay through its contacts R1 shorts the shading coil 125 so that the motor drives the price setting mechanism toward a lower price.

When the slider 128 reaches that one of the contacts 129 that is connected to the depressed key, current is diverted from the leads 131 and 132 to a lead 137 that is connected to a slider 138 cooperating with contacts 139 of the units selector switch 122. The contacts 139 are connected respectively through leads 140 to the contact portions of the keys 9 that form a continuous circuit between the leads 131 and 132. This continuous circuit is broken by the depression of any one of the units keys 9 so that the current flowing from the slider 138 to the keys flows to the lead 131 or 132, but not both, to energize either the forward or the reverse relay as may be necessary to drive the slider toward the selected one of the units contacts. The selected contact is not connected to any other circuit and, therefore, when the slider reaches and rests upon that contact the circuit is dead and the forward and reverse relays drop out and the motor stops.

Additional circuits are included to control the motor and these circuits are controlled by contacts on the forward and reverse relays. The sequence of operations as soon as a change is made in the price selected by the keys 9 and 10 first energizes one of the relays but that does not energize the motor because its field coil 124 is not yet connected to the source of power. Suppose, for example, that the forward relay is energized. It then closes its normally open contact F3 and opens its normally closed contact F2 so that current may flow from the lead 127 through the now closed contact F3, the normally closed contact R2 of the reverse relay and through a solenoid coil 141 and a lead 142 connected to the return leads 136 and 134. The energization of the solenoid 141 causes it to retract its armature 143 and thereby withdraw a detent 144 from a star wheel 145 that is mechanically connected to the armature 118 of the motor 23. As the solenoid armature 143 retracts, it unlocks the motor and also closes a contact 146 so that current may flow from the lead 127 through a lead 147, the now closed contact 146 and a parallel combination of a resistor 148 and a half-wave rectifier 149 and then to the field coil 124 of the motor 23. The other side of the field coil is connected to the return lead 134. As soon as the armature 143 is completely retracted it also closes a contact 150 so that current may flow directly to the field coil 124 of the motor.

If the reverse relay should have been engaged rather than the forward relay, corresponding circuits through the normally open contacts of the reverse relay and normally closed contacts of the forward relay are completed so that the motor is energized but since the reverse shading coil 125 is closed the motor operates in the reverse direction. The combination of normally open and normally closed contacts on the relays insures that the motor 23 is deenergized as long as neither relay is energized or if both relays are energized.

When the selector switches 122 and 123 are driven to positions corresponding to the selected ones of the keys 9 and 10, the energized relay F or R drops out but the motor is still energized by current flowing through the lead 147 and the contacts 146 and 150. The opening of the relay de-energizes the solenoid 141 so its armature 143 is released. The first portion of the travel of the armature opens the contacts 150 to introduce the parallel combination of the resistor 148 and the rectifier 149 into the circuit. The direct current component introduced by the rectifier 149 provides a strong braking force to stop the motor and thus decrease the shock of the engagement between the detent 144 and the star wheel 145.

Referring now to Figures XIV and XV, the price selected by the keys 9 and 10 is displayed through an opening 151 of a mask 152 that fits within the window 6 and that serves to conceal the remainder of a pair of disks 153 and 154 upon which price indicia are printed. The disks 153 and 154 are mounted on the shafts 120 and 121 of the selector switches 122 and 123. The selector switches, in addition to the contacts, each include a circular contact ring 155 that serves to conduct current to the sliders 128 or 138. The selector switch shafts 120 and 121 are driven through flexible shafts 156 and 157 that are connected to shafts of the gearing 119 and the other ends of the gearing shafts carry disks 158 and 159 supporting the units and tens dials 28 and 33 respectively which carry price indicia that may be viewed through an opening in a mask 160 forming part of a window on the customer's side of the scale.

The gearing 119 is shown in Figure XVI and includes the pulley 26 that is driven from the motor 23 by means of the belt 25. The units shaft 27 journaled in the frame of the gearing mechanism carries the pulley 26, the pinion 29, the star wheel 145, a spacer 161, a cam 162, and a second pinion 163 all of which elements are rigidly secured to the shaft 27. In addition, a gear wheel 164 is loosely journaled on the shaft. Furthermore, the shaft 27 at the far end, as viewed in Figure XVI, carries the customer's units price disk 158 and, adjacent the pulley 26, is connected to the flexible shaft 156 that drives the merchant's units price disk 153. The pinion 163, rigidly attached to the shaft 27, meshes with and drives a transfer gear wheel 165 that rotates on a short shaft 166 carried in a rockable frame 167. A transfer pinion 168 carried on the shaft 166 and driven by the transfer gear 165 meshes with and drives the loosely journaled gear wheel 164. The gear ratio through the pinion 163, transfer gear 165, transfer pinion 168 and gear wheel 164 is such that the gear wheel 164 rotates at one-thirteenth the speed of the pinion 163.

The rockable frame 167 is connected through a link 169 to a lever in the form of a U-shaped frame 170 that is pivotally mounted on a rod 171 located parallel to and at a lower elevation than the shaft 27. A roller 172 mounted in the U-shaped lever 170 engages the cam 162 so as to oscillate the U-shaped lever 170 and the rockable frame 167 as the shaft 27 turns. The rocking motion adds a component of motion to that delivered through the transfer gears and pinions to the gear wheel 164 so that during nine-tenths of the revolution of the units shaft 27 the gear wheel 164 stands stationary and during the remaining one-tenth of the units shaft revolution the gear wheel 164 is advanced one-thirteenth of a revolution.

The gear wheel 164 is connected through an idler 173 to a tens gear wheel 174 that is mounted on a shaft 175 one end of which carries the customer's dimes indicating disk 159 and the other end of which is connected to the flexible shaft 157.

This mechanism constituting the gearing 119 serves to set up a merchant's and customer's price indication and at the same time position the rack 32 according to the indicated price so that the tangent bar 38 is in position to cooperate with the weighing mechanism in providing a cost or computed amount indication. The gearing including the rockable frame 167 serves to hold the dimes indication fixed during nine-tenths of a revolution of the units shaft not only to align the exposed price indicia but also to insure that the slider 128 of the dimes selector switch 123 shall be accurately located on a contact except when the price is changing from a value ending in nine to a value ending in zero.

The computing weighing scale illustrated in Figures I to XVI inclusive, employs a movable chart on which computed cost or amount indications are printed and employs a mechanical drive to rotate the chart according to the cost of the article. Alternative forms of construction may be employed to provide a cost or computed amount indication and such an alternative arrangement is shown in Figures XVII and XVIII. These figures show only the load counterbalancing mechanism and a portion of the arm leading up to the rack 32 that is used as part of the price setting mechanism. It is to be understood that a price setting mechanism such as that shown in the foregoing figures will be employed regardless of whether a mechanical drive to a drum chart is employed or whether, as in the alternative form, an optical system is used to project an enlarged image of indicia carried on a transparent chart.

Referring to Figure XVII, a pair of pendulum bodies 176 and 177 similar to the pendulum bodies 11 and 12 are carried in a framework 178 of which only fragments are shown. The pendulum bodies 176 and 177 are provided with pendulum weights 179 and 180 that are used for adjusting their load counterbalance capacity. They are also provided with surfaces 181 and 182 that are concentric with respect to their turning centers. Steel ribbons 183 and 184 attached to the upper ends of the concentric surfaces 181 and 182 carry loading boxes 185 and 186 of a rack drive frame 187. The rack drive frame 187, as in the preceding example, is provided with a track upon which a carriage 188 is adapted to travel as it follows a tangent bar 189 during vertical motion of the rack drive frame 187. The tangent bar 189 is similar in construction to the tangent bar 38 and is carried on a shaft 190 to the forward end of which is attached an arm 191. The upper end of the arm 191 (not shown in the drawing) engages a pin on a price setting rack similar to the rack 32.

The carriage 188 is urged away from the tangent bar 189 by a weight 192 that is suspended from a ribbon 193 that, after passing over a pulley journaled on the rack drive frame 187, is attached to the carriage 188. The carriage 188 is urged in the other direction by tension in a ribbon 194 that wraps around and is attached to a small drum 195 mounted on the same shaft as a larger drum 196. The shaft of the drums 195 and 196 is carried in a rockable frame 197 that is pivotally mounted from the lower end of a depending arm 198 of the loading box 186. The upper end of the rockable frame 197 has a roller 199 that cooperates with a track 200 formed on a member 201 attached to the frame of the scale. The track 200 and pivotal mounting of the frame 197 is employed to draw the rack drive frame 187 against the cencentric surface 181 of the pendulum 176 and thereby take up all the backlash or possibility of horizontal movement of the rack drive frame 187, as well as prevent horizontal movement of the drums 195 and 196. For illustration, the roller 199 is shown above the drums 195 and 196 although it is preferable that it be substantially coaxial with the drums.

The larger drum 196 is connected through a steel ribbon 202 to the upper end of a larger sector 203 of a cost chart drive-assembly arm 204. The arm 204 extends from a rockably mounted shaft 205 that is journaled in bearings carried in the upper portion of the frame 178. A stem 206 extends downwardly from the shaft 205 in the space forward of the load counterbalancing mechanism and at its lower end carries a fitting 207 in which a glass chart 208 is mounted. The chart 208 carries indicia that, by means of an optical system (not shown), may be enlarged and projected upon a screen thereby giving enlarged images of the cost indicia.

The weight of the chart 208 and fitting 207 is counterbalanced by a weight 209 adjustably mounted on a threaded stem 210 extending upward from the shaft 205 in general alignment with the downwardly extending stem 206. In addition to the arm 204 and the stems 206 and 210, the shaft 205 carries a sector 211 that is concentric with respect to the shaft 205. A steel ribbon 212 attached to the upper end of the sector 211 passes downward over the sector and carries, at its lower end, a weight 213 that is of sufficient size to counterbalance the pull of the weight 192 at the other end of the cast indicating system. The weights 192 and 213 thus serve to maintain tension in the ribbons while the remaining portions of the cost indicating system are in neutral equilibrium so that there is no reaction force through the tangent bar 189 to the load counterbalancing mechanism.

The weight 213 includes a channel-shaped guide member 214 the sides of which overlie the edges of the sector 211 while the ribbon 212 lays against the bottom of the channel of the channel-shaped member. A pair of rollers 215 carried in a bracket 216 adjustably mounted from the frame of the scale barely contact or are spaced close to the back of the channel-shaped guide member 214 to hold it in position and prevent it from swinging during changes in load or price.

The cooperation between the rack drive frame 187 and the tangent bar 189 in this example is the same as the cooperation between the rack drive frame 15 and the tangent bar 38 of the first example and in each the carriage containing the rollers is positioned according to the relative positions of the frame and tangent bar. The adjustments to the load counterbalancing mechanism of this example are the same as in the preceding example so that the rack drive frame 187 moves vertically from its zero position through a distance that is exactly proportional to the load on the weighing scale. The tangent bar 189 is set at an angle the tangent of which is proportional to the price. As in the preceding example, because the rollers 195 and 196 are carried on the rack drive frame 187, the tangent bar 189 must be set at an angle at zero price so that the horizontal motion of the carriage will impart sufficient rotation to the drums 195 and 196 to cancel the vertical translation of the drums and leave the cost indication unchanged. In Figure XVII, the tangent bar 189 is shown in its maximum price position and in that position the upward movement of the rack drive frame 187 causes the carriage 188 to move toward the right with the ribbon 194 winding onto the drum 195. As the drum 195 turns it also turns the drum 196 and unwinds the ribbon 202 so that the weight 213 may produce counterclockwise rotation of the shaft 205 and the chart 208. The amount of this counterclockwise rotation of the chart 208 is determined by the rotation of the drums 195 and 196 plus the upward translation of the drums.

At zero price when the tangent bar is inclined toward the left instead of toward the right the carriage 188 moves to the left with an increase in load so that the resulting counterclockwise rotation of the drums 195 and 196 cancels the upward translation of the rack drive frame 187 with a result that the cost indicating system is not moved. As the tangent bar is moved to correspond to an intermediate price, various combinations of these movements occur but the geometry is such that for all combinations of price and weight the combination of the horizontal travel of the carriage 188 plus the upward translation of the drums 195 and 196 results in a correct movement or travel of the chart 208.

This example is similar to the first in that the track 200 which corresponds to the track 109 is used to adjust the zero indication of the cost indicating system. This follows because any horizontal displacement of the track 200 permits a corresponding horizontal displacement of the drums 195 and 196 with a resulting increment of rotation because the carriage 188 and ribbon 194 are not correspondingly translated. The angular relationship between the track 200 and the tangent bar 189 must be precisely controlled because each affects the cost indication in substantially the same manner.

These examples have the common characteristic that the travel of the drive mechanism leading to the cost indicating chart when the price is set at a maximum value is substantially twice the travel of the rack drive frame. In the first example this permits the use of either a larger pinion on the indicator shaft or multiple revolutions of the cost indicating chart. In the second example it permits the arm 204 of the cost indicating mechanism to be twice as long as the radius of the concentric surfaces 181 and 182 of the pendulum bodies and still permit the maximum angular travel of the cost indicating mechanism to be the same as the maximum angular rotation of the pendulum bodies themselves.

The improved mechanism provides a weighing scale that indicates, for any selected price, the cost of an article that is being weighed on the scale. The mechanism is driven directly from the scale without any external source of power, except that used in the price selecting mechanism, and is sufficiently light in weight so as not to materially increase the time required for the scale to come to balance. Sufficient adjustments are provided in the mechanism so that it may be readily constructed and adjusted to give highly accurate indication.

Various modifications of structure may be made as required to adapt the mechanism to specific weighing scales or similar apparatus.

This is a continuation of application Serial No. 27,125 filed May 14, 1948, and allowed June 3, 1953.

Having described the invention I claim:

1. In a computing weighing scale, in combination, a frame, an automatic load counterbalancing mechanism supported on the frame and including a generally horizontal member that is moved vertically through a distance proportional to the load on the scale, a bar pivotally mounted in the frame and lying in a plane perpendicular to the length of said horizontal member and to its path of movement, a carriage supported on said horizontal member and operatively connected to the pivoted bar, an indicating mechanism operatively connected to the carriage, means for setting the angular position of the pivoted bar according to selected prices, and adjustable means for moving the pivot axis of the bar with respect to the frame to register with the zero load position of said horizontal member.

2. In a computing weighing scale, in combination, a frame, an automatic load counterbalancing mechanism mounted on the frame and including a generally horizontal member that is translated vertically through a distance proportional to the load on the scale, a bar pivotally mounted in the frame on an axis perpendicular to the length of the horizontal member and to its path of movement, a driven member carried on the horizontal member and movable along its length, said driven member also engaging said bar whereby its position is determined by the vertical motion of the horizontal member and the position of the bar, a price setting member that is mounted in the frame and that is connected to the bar at the intersection of its path of movement and the bar, and price selection mechanism for moving the price setting member along a path parallel to the path of said driven member.

3. In a computing weighing scale, in combination, a frame, an automatic load counterbalancing mechanism mounted on the frame and including a portion that is translated a distance proportional to the load on the scale, a bar pivotally mounted on the frame and positioned adjacent the path of said translatable portion, a driven member carried on said translatable portion and moved along said portion by contact with said bar, an indicating mechanism driven by said driven member, a second member that is mounted on the frame and driven along a path parallel to the path of said driven member, said pivotally mounted bar and said second member being connected at the intersection of the bar and the path of the second member, and a support in the frame for the second member, said support being adjustable to vary the distance between the pivoting axis of the bar and the path of the second member.

4. In a computing weighing scale, in combination, a frame, an automatic load counterbalancing mechanism mounted on the frame and including a portion that is translated a distance proportional to the load on the scale, a bar pivotally mounted in the frame and positioned adjacent the path of said translatable portion, a driven member carried on said translatable portion and moved along said portion by engagement with said bar, an indicating mechanism driven by said driven member, a second member that is carried in the frame and that is driven along a path parallel to the path of said driven member, said pivotally mounted bar and said second member being connected at the intersection of the bar and the path of the second member, and a support for the second member that is adjustable transversely of the path of the second member for varying the condition of parallelism between the paths of the driven and second members.

5. In a computing weighing scale, in combination, a frame, an automatic load counterbalancing mechanism mounted on the frame and including a portion that is translated a distance proportional to the load on the scale, a bar pivotally mounted in the frame and positioned adjacent the path of said translatable portion, a driven member carried on said translatable portion and moved along said portion by engagement with said bar, an indicating mechanism driven by said driven member, a second member that is mounted in the frame and that is driven along a path parallel to the path of said driven member, said pivotally mounted bar and said second member being connected at the intersection of the bar and the path of the second member, and a pair of supports for the second member said supports being independently adjustable for varying the condition of parallelism between the paths of the driven and second members and the distance between the pivoting axis of the bar and the path of the second member.

6. In a device of the class described, in combination, a load counterbalancing mechanism a first member that is translated vertically by the load counterbalancing mechanism, said member having vertical surfaces juxtaposed to portions of the counterbalancing mechanism, a second member carried on the first member and movable along a horizontal path, a frame that supports the counterbalancing mechanism, a bar pivotally mounted in the frame on an axis perpendicular to the paths of the members and positionable in selected angular relation to the path of the first member, said second member contacting said bar whereby the second member is translated horizontally a distance depending upon the travel of the first member and the angular position of the bar, an indicating mechanism, a counterbalance weight, flexible members connecting said second member to the indicating mechanism and the counterbalance weight, and rotatable members for guiding the flexible members, at least one of the rotatable members being translated vertically by said first member and guided by said frame.

7. In a device of the class described, in combination, a load counterbalancing mechanism, a first member that is translated vertically by load counterbalancing mechanism and that is restrained against horizontal movement by loose engagement with portions of the counterbalancing mechanism, a frame for supporting the counterbalancing mechanism, a bar pivotally mounted in the frame and positioned in a plane parallel to the member and its path of movement, a second member carried on the first member and driven therealong by contact with said bar, an indicator, a flexible tape and drum system for driving the indicator from the second member, and a supporting member for a portion of the tape and drum system said supporting member being carried vertically by the first member and guided horizontally by said frame.

8. In a device of the class described, in combination, an automatic load counterbalancing mechanism, a first member that is translated by the load counterbalancing mechanism through a distance proportional to the load being counterbalanced, a second member carried on the first member and translatable along its length, a frame for supporting the counterbalancing mechanism a bar that is pivotally mounted in the frame and operatively connected to the second member, an indicating mechanism, a tape and drum system for connecting the second member to the indicating mechanism whereby the indicating mechanism indicates the travel of the second member, a subframe movably mounted on the first member for carrying part of the tape and drum system, and a guide for controlling the movement of the subframe with respect to the first member, said guide being angularly adjustable to provide a component of movement of the indicating mechanism that is proportional to a selected fractional part of the movement of the first member.

9. In a device of the class described, in combination, a load counterbalancing mechanism, a generally horizontal member that is supported on and moved vertically by the counterbalancing mechanism, a second member that is carried on the horizontal member and movable with respect thereto, a fixedly supported bar located in a plane parallel to the horizontal member and its path of movement and engaged with said second member, a yoke pivotally mounted on the horizontal member, a plurality of drums journaled in the yoke and movable horizontally by pivoting of the yoke, indicating mechanism operatively driven from certain of the drums and applying a constant torque to the drums, a fixed guide for controlling the horizontal position of the drums, a tape drive connecting another of the drums, to said second member, and a counterweight suspended by a tape trained over a pulley journaled on the horizontal member and connected to the second member for offsetting the constant torque applied to the drums and for holding the drums against the fixed guide.

10. In a device of the class described, in combination, a stationary support frame, automatic load counterbalancing mechanism mounted on the support frame, indicating means mounted on the support frame, a member carried on said counterbalancing mechanism and translated transversely to its length through distances proportional to the loads being counterbalanced, a straight edged bar pivotally mounted on the support frame and rotatively adjustable in a plane adjacent and parallel to said member and its path of movement, a carriage supported on said member and contacting said bar, and means operatively connecting said carriage to said indicating means, whereby said indicating means is actuated jointly by the translatory movement of the member carried by the load counterbalancing mechanism and the displacement of the carriage as determined by the adjusted position of said bar.

11. In a device of the class described, in combination, a stationary support frame, automatic load counterbalancing mechanism mounted on the support frame, indicating means mounted on the support frame, a member carried on said load counterbalancing mechanism and translated transversely of its length through distances proportional to the load being counterbalanced, a straight edged bar pivotally mounted in said support frame and rotatively adjustable in a plane adjacent and parallel to said member and its path of movement, a carriage supported on said member and operatively engaged with an edge of said bar, a drive for said indicating means mounted on said member and operatively connected to said indicating means, and means operatively connecting the carriage to said indicating means drive.

12. In a device of the class described, in combination, a stationary support frame, automatic load counterbalancing mechanism mounted on said frame, indicating means mounted on the frame, a member supported on the counterbalancing mechanism and translated transversely to its length through distances proportional to the load being counterbalanced, a straight edged bar pivotally mounted in the frame and positionable in a plane adjacent and parallel to said member and its path of movement at an angle to the path of the member according to the price of a commodity, a carriage operable along said member and operatively engaged with said bar to be driven along the member according to the adjusted position of the bar, a drum rotatably mounted on said member, and drive means connecting said drum to said carriage and to said indicating means whereby said indicating means is driven according to the translatory movements of said member and the rotation of said drum as determined by the translation of the carriage.

13. In a device of the class described, in combination, a stationary frame, a load counterbalancing mechanism, a member supported on said load counterbalancing mechanism and arranged to move through distances proportional to the load being counterbalanced, a track on said member extending transversely to its movement, a bar pivotally mounted on said frame and extending adjacent to said track, a carriage mounted on the track and operatively connected to said bar, an indicating means rotatably mounted on said frame, and tape drive means from said carriage to said indicating means, said tape drive including a first portion extending parallel to said track and a second portion extending parallel to the path of said member.

14. In a device of the class described, in combination, a stationary support frame, automatic load counterbalancing mechanism mounted on the support frame, indicating means mounted on a stationary support, a member operatively connected to the load counterbalancing mechanism for translation transversely to its length through distances proportional to the load being counterbalanced, a pivotally mounted straight-edged bar that is rotatively adjustable about an axis extending generally perpendicular to the direction of translation of said member said bar being adjustable through a range extending through substantial angles at either side of a position in which the straight edge of said bar is parallel to the direction of translation of said member, means positionable along said member by engagement with said straight-edged bar, and means operatively connecting the positionable means and said member to said indicating means whereby said indicating means is driven jointly by said member and said positionable means.

15. In a device of the class described, in combination, a stationary support frame, automatic load counterbalancing mechanism mounted on the support frame, indicating means, and means for driving said indicating means through selectable increments of travel for equal increments of load counterbalanced by the automatic load counterbalancing mechanism, said driving means comprising a member operatively connected to the load counterbalancing mechanism and translated transversely of its length according to the movement of said counterbalancing mechanism, a traveler mounted on said member and movable along its length, a straight-edged bar mounted adjacent said member for rotative adjustment about an axis perpendicular to the direction of translation of said member to either side of a position in which the straight edge of said bar is parallel to the direction of translation of said member, said bar being engaged with the traveler to drive it along said member, and connecting means interconnecting the traveler, the member, and the indicating means, whereby said traveler and said member jointly control said indicating means.

References Cited in the file of this patent

UNITED STATES PATENTS

| | | |
|---|---|---|
| 580,783 | Fuller | Apr. 13, 1897 |
| 713,265 | Whitney | Nov. 11, 1902 |
| 2,365,329 | Bench et al. | Dec. 19, 1944 |